2 Sheets—Sheet 1.

H. L. BROWER.
Fire Alarm.

No. 109,292. Patented Nov. 15, 1870.

Witnesses:
Wm. H. Roine,
Henry Kaiser.

Inventor:—
H. L. Brower
by his Atty
Wm. D. Baldwin

H. L. BROWER.
Fire Alarm.
No. 109,292.  Patented Nov. 15, 1870.
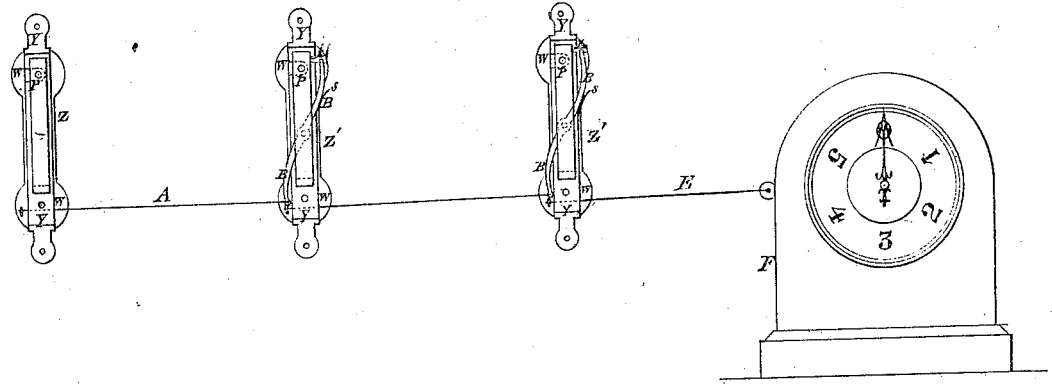
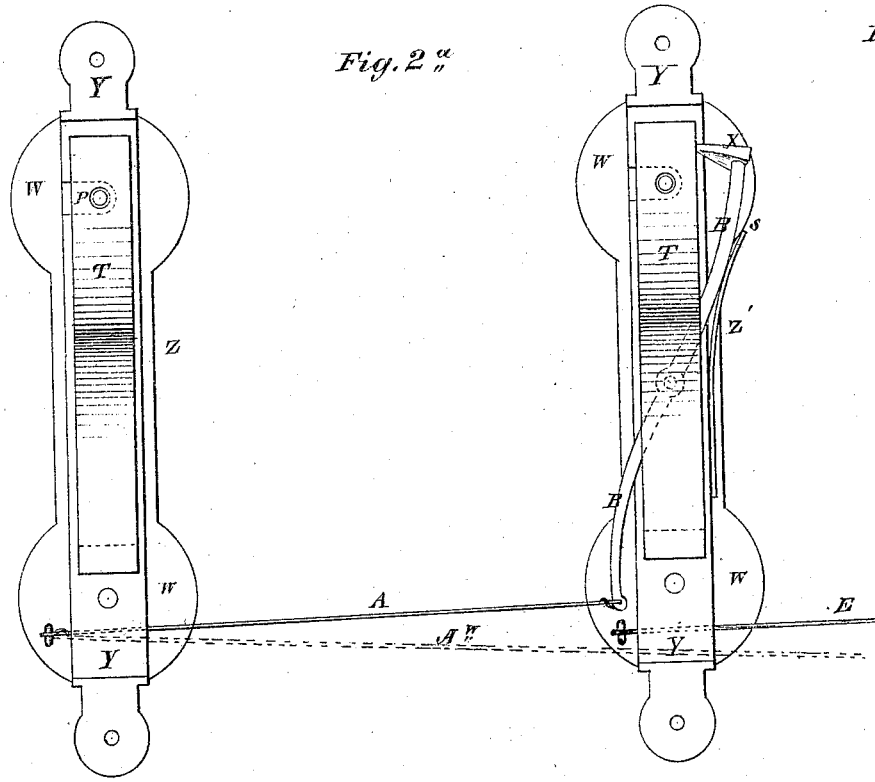
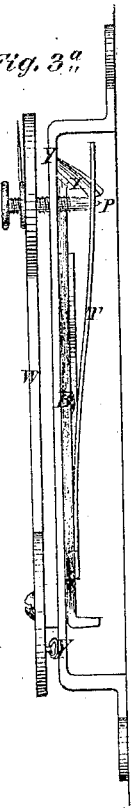
Witnesses:—
Wm H Rowe
Henry Kaiser
Inventor.
H. L. Brower
by his Atty
Wm D Baldwin

United States Patent Office.

HENRY L. BROWER, OF NEW YORK, N. Y., ASSIGNOR TO CHARLES D. FREDERICKS, OF SAME PLACE.

Letters Patent No. 109,292, dated November 15, 1870.

---

IMPROVEMENT IN CONNECTING FIRE-DETECTERS WITH THE ALARM.

---

The Schedule referred to in these Letters Patent and making part of the same.

---

*To all whom it may concern:*

Be it known that I, HENRY L. BROWER, of the city of New York, county of New York, and State of New York, have invented a new and useful Improvement in the Mode of Connecting Fire-Detecters with the alarm attached or belonging thereto; and I do hereby declare that the following is a full, clear, and exact description of the construction and operation of the same, reference being had to the annexed drawing making a part of this specification, being numbered No. 1 and No. 2.

Figure 1:
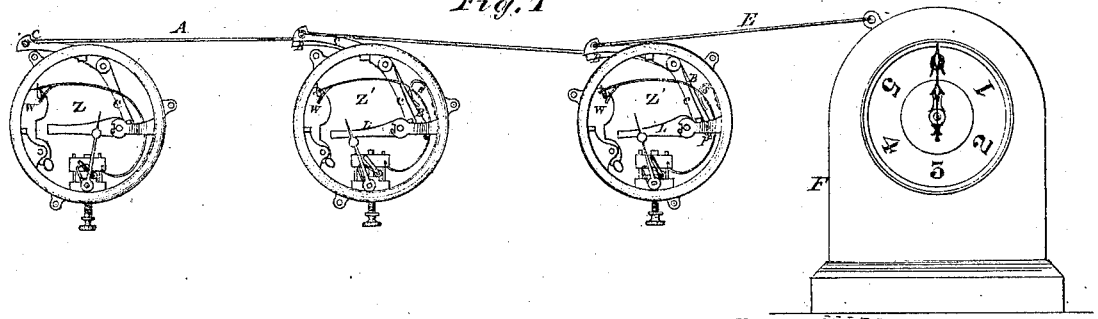
Figure 2:
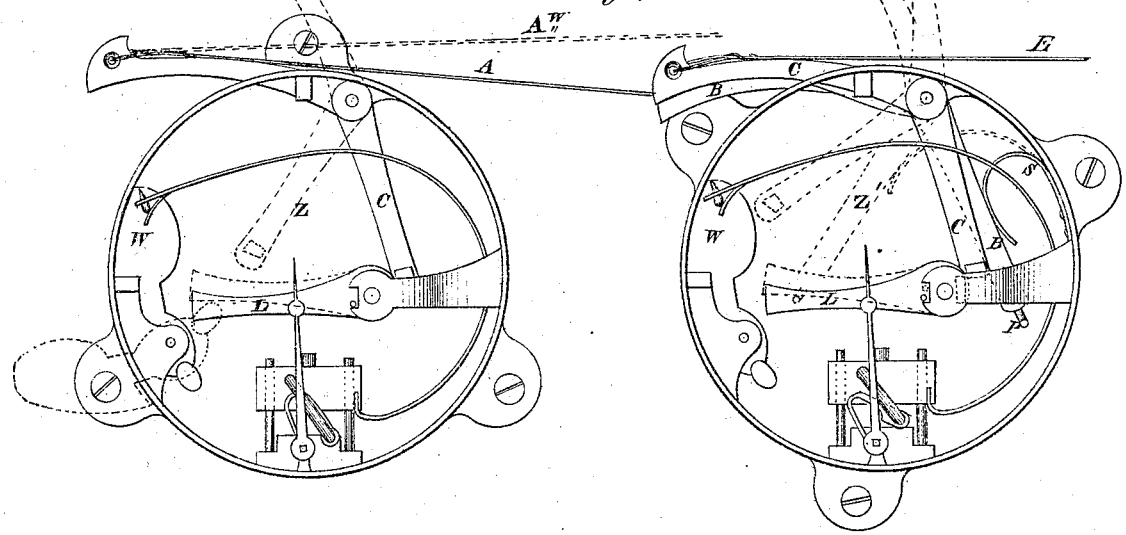

Figures 1 and 1ª represent front views of fire-detecting apparatus embodying my invention;

Figures 2 and 2ª represent views of parts thereof upon an enlarged scale; and

Figure 3:
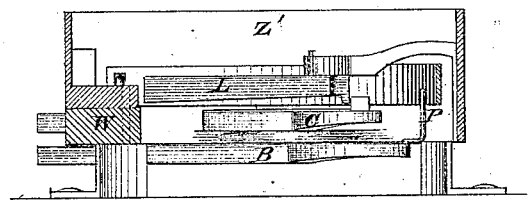

Figures 3 and 3ª represent transverse sections of the detecters.

In mechanical fire-detectors heretofore made each thermo-detecter, or detecter of an increased temperature, has been connected with the alarm-giver or annunciator by a separate wire extending from the detector the entire distance to the annunciator, as many wires being required as there are detecters.

In a building where there are many rooms, or where the rooms are large and require many detecters, the number of wires required to transmit signals, therefore, corresponds with the number of detecters.

The object of my invention is to obviate the necessity of employing so many separate wires extending to the annunciator; and My invention consists, first, of the combination of a series of two or more thermo-detecters with the annunciator, through the intervention of a single wire, which transmits the signals of any one of the detecters in the series to the annunciator.

My invention consists further of the combination of the detecter with a tripping-lever, or its equivalent, by means of which the detecter is caused to transmit a signal toward the annunciator.

My invention may be carried into effect in several ways, two of which are represented upon a small scale at figs. 1 and 1ª, in each of which a series of three detecters, Z Z' and Z', is connected with the annunciator F, through the intervention of a single wire, E, which transmits to the annunciator the signal given by any one detecter of the series.

The old and the improved system are fully shown in drawing No. 1 at fig. 2.

In this case there are two detecters, Z Z', in the series, each of which is fitted with a thermometric spring, which, when heated beyond the predetermined temperature, releases a weight, W, that, by turning on a pivot, imparts motion to a catch-lever, L, thereby releasing a lever, C, which, being connected with an annunciator by a wire, slacks that wire and transmits a signal to the annunciator.

According to the old system, the detecter Z furthest from the annunciator, and the detecter Z' nearest the annunciator, would be connected with it by the separate wires Aʷ and E extending all the way to the annunciator, the two wires Aʷ and E being side by side the whole length of the shorter wire.

By my system both detecters, Z Z', are combined with the annunciator through the intervention of the same wire E, and the employment of the separate wire Aʷ is dispensed with.

The mode in which the signals are transmitted through the one wire, E, is as follows:

The detecter Z' nearest the annunciator is fitted with a tripping-lever, B, having a stud or pin, P, at its lower end, in such position that when the lever is vibrated the pin is caused to pass under the catch-lever L, and to raise it sufficiently to loose the lever C, which is connected with the annunciator by the wire E, so as to slack that wire and pass a signal.

The outer arm of the tripping-lever B is connected with a wire, A, extending from the preceding detecter Z of the series, and a spring, S, is applied to the tripping-lever B to bear against and move it whenever the connecting-wire A is slacked.

Hence, whenever the further detecter Z passes a signal by slacking the connecting-wire A, the tripping-lever B of the next succeeding detecter is moved by its spring S, the levers L C of that detecter are operated, and the signal is thus transmitted through the connecting-wire E extending toward the annunciator.

The wire extending between any intermediate detecter in the series, and the annunciator thus transmits a signal from any one of the preceding detecters of the series, however many there may be, and the employment of separate parallel wires is dispensed with.

The construction of the series represented at drawing No. 2 is represented upon an enlarged scale at figs. 2ª and 3ª.

In this example the detecters Z Z' are constructed differently from those before described, each having a weighted pendulum, W, which is constructed to turn upon a pivot near the lower end of the frame of the detecter, and is maintained in an inverted position until released therefrom, either by the expansion of a thermometric spring, T, or by the passage of a signal from a preceding detecter in the series.

In this case, according to the old system, the detecter Z further from the annunciator would be connected with it by a wire, Aʷ, and the detecter Z' nearer the annunciator would be connected with it by a separate wire, E, extending side by side with the wire Aʷ.

By my improvement the wire E transmits the signals of both of the detecters Z Z', and of as many more as there might be in the series beyond the first Z.

In order to effect this the detecter Z' nearer the annunciator is fitted with the tripping-lever B, which is connected at one end with the preceding detecter Z by the wire A, and at the other end is fitted with a wedge, X, for the purpose of liberating the inverted pendulum W, and permitting it to turn over by gravity and to pass a signal.

A spring, S, also, is provided to move the tripping-lever B and cause it to liberate the pendulum whenever the connecting-wire A, extending from the preceding detecter in the series is slacked.

Hence, whenever the further detecter passes a signal, it is communicated through the tripping-lever, and next succeeding detecter Z', to the wire E extending toward the annunciator, and is transmitted through that wire. This wire E, therefore, transmits a signal from any one of the preceding detecters to the annunciator, and the employment of separate wires, extending side by side, is dispensed with.

The smallest number of detecters which constitutes a series upon my system is two, but the number may be increased indefinitely, each intermediate detecter, when constructed as above described, being provided with a tripping-lever, or its equivalent, to pass the signal from the next preceding detecter in the series.

The operation of an intermediate detecter in transmitting a signal does not in any respect affect its independent action in passing a signal, because the movable weight of each detecter is not trammeled nor hampered in any manner by the tripping-lever, or the connection from the preceding detecters in the series, but is free to be operated by the thermometric spring or indicator peculiar to the detecter of which the movable weight forms part, in the same manner and with the same effect as if each detecter of the series was connected with the annunciator by a separate wire appropriated to itself.

Having thus described two modes, in which I have contemplated the application of the principle of my invention, I declare that I am aware that electro-magnetic alarms have been constructed, in which two or more devices for making or breaking the electric circuit have been connected with an annunciator by the same wire, but the combination and its mode of operation are substantially different, in many respects, from my invention.

What I claim, and desire to secure by Letters Patent, is—

1. The combination of a series of detecters with the annunciator by means of a single wire, which transmits the signal passed by each detecter of the series, substantially as before set forth.

2. The combination of the detecter with a tripping-lever, by means of which the detecter is caused to transmit a signal from a preceding detecter toward the annunciator, substantially as before set forth.

HENRY L. BROWER.

Witnesses:
C. D. FREDRICKS,
N. L. BROWER.